US 8,842,517 B2

(12) United States Patent
Banerjee et al.

(10) Patent No.: US 8,842,517 B2
(45) Date of Patent: Sep. 23, 2014

(54) SYSTEM AND METHOD FOR MAINTAINING CONNECTIVITY IN A SINGLE-HOP NETWORK ENVIRONMENT

(71) Applicant: Cisco Technology, Inc., San Jose, CA (US)

(72) Inventors: Ayan Banerjee, Fremont, CA (US); Veena Raghavan, Fremont, CA (US); Abhay Roy, Cupertino, CA (US)

(73) Assignee: Cisco Technology, Inc., San Jose, CA (US)

(*) Notice: Subject to any disclaimer, the term of this patent is extended or adjusted under 35 U.S.C. 154(b) by 183 days.

(21) Appl. No.: 13/629,600

(22) Filed: Sep. 27, 2012

(65) Prior Publication Data
US 2014/0086043 A1 Mar. 27, 2014

(51) Int. Cl.
*H04L 12/26* (2006.01)
(52) U.S. Cl.
USPC .................................................. 370/217
(58) Field of Classification Search
None
See application file for complete search history.

(56) References Cited

U.S. PATENT DOCUMENTS

| 6,587,475 | B1* | 7/2003 | Przygienda ................ 370/465 |
| 7,269,133 | B2* | 9/2007 | Lu et al. ..................... 370/219 |
| 2003/0218982 | A1* | 11/2003 | Folkes et al. ................ 370/238 |
| 2008/0205395 | A1* | 8/2008 | Boddapati et al. ........... 370/390 |
| 2009/0037607 | A1 | 2/2009 | Farinacci et al. |
| 2009/0219804 | A1* | 9/2009 | Cole et al. ................... 370/218 |
| 2012/0213117 | A1 | 8/2012 | Banerjee et al. |
| 2013/0176843 | A1* | 7/2013 | Cole et al. ................... 370/218 |

OTHER PUBLICATIONS

"Information technology—Telecommunications and information exchange between systems—Intermediate System to Intermediate System intra-domain routeing information exchange protocol for use in conjunction with the protocol for providing the connectionless-mode network service," International Standard ISO/IEC 10589, Nov. 15, 2002; 210 pages.
"Introduction to Intermediate System-to-Intermediate System Protocol," Cisco Systems, Inc., 2002; 25 pages.
"IS-IS" from Wikipedia, the free encyclopedia, Jun. 19, 2012; 3 pages http://en.wikipedia.org/w/index.php?title=IS-IS&oldid=498404709.
"Understanding IS-IS Pseudonode LSP," Document ID: 49627, Cisco Systems, Inc., Aug. 10, 2005; 8 pages.
Lapukhov, Petr, "What is Overlay Transport Virtualization?" INE. com, Feb. 15, 2010, 21 pages; http://blog.ine.com/2010/02/15/what-is-overlay-transport-virtualization/.

(Continued)

*Primary Examiner* — Otis L Thompson, Jr.
(74) *Attorney, Agent, or Firm* — Patent Capital Group (57) ABSTRACT

A method is provided in one example embodiment and includes receiving a first pseudo-node identifier associated with a first network node via a network. The first pseudo-node identifier is generated by the first network node in a first designated intermediate system (DIS) operation. The method further includes detecting a loss of connectivity to the first network node, and receiving a second pseudo-node identifier associated with a second network node via the network. The second pseudo-node identifier is generated by the second network node in a second DIS operation. The method further includes executing a first network path determination operation using the first pseudo-node identifier and the second pseudo-node identifier when an elapsed time between the detecting of the loss of connectivity with the first network node and the executing of the first network path determination operation is within a predetermined threshold.

20 Claims, 4 Drawing Sheets

(56) References Cited

OTHER PUBLICATIONS

USPTO May 17, 2013 Final Office Action from U.S. Appl. No. 13/032,444.
USPTO Apr. 14, 2014 Notice of Allowance from U.S. Appl. No. 13/032,444.
Cisco Systems, Inc., "Cisco Nexus 7000 Series NX-OS OTV Configuration Guide, Release 5.x," First Published Jul. 6, 2010; Last Modified Oct. 26, 2010; 56 pages; http://www.cisco.com.
Cisco Systems, Inc. "Introduction to Intermediate System-to-Intermediate System Protocol," 1992-2002; 25 pages; http://www.cisco.com/en/US/products/ps6599/products_white_paper09186a00800a3e6f.shtml#wp39303.
"4.4. Designated Routers," [retrieved and printed Feb. 1, 2011]; 12 pages; http://fengnet.com/book/ospfandisis/ch04lev1sec4.html.
Soricelli, Joseph M., et al., "Certified Internet Associate: Study Guide—Chapter 7," Juniper Networks, Inc., © Jun. 2003; 46 pages; http://kb.juniper.net/kb/documents/public/junos/StudyGuides/Ch7_from_JNCIA_studyguide.pdf.
USPTO Jan. 9, 2013 Non-Final Office Action from U.S. Appl. No. 13/032,444.

* cited by examiner

SYSTEM AND METHOD FOR MAINTAINING CONNECTIVITY IN A SINGLE-HOP NETWORK ENVIRONMENT

TECHNICAL FIELD

This disclosure relates in general to the field of communications and, more particularly, to maintaining connectivity in a single-hop network environment.

BACKGROUND

Networking architectures have grown increasingly complex in communications environments. Data traffic has grown extensively in recent years, which has significantly increased the demands on network resources and devices. Certain routing protocols have added a layer of complexity to connectivity in the network. As the subscriber base of end users increases, efficient management of communication resources becomes even more critical. In some instances, as new information propagates in the network, windows of information become inconsistent. Such windows may result in disruptions for network traffic, or the dropping of certain traffic flows due to inaccurate routing information amongst network nodes. Hence, there is a significant challenge in maintaining accurate connectivity data in a network environment.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a first pseudo-node identifier associated with a first network node via a network. The first pseudo-node identifier is generated by the first network node in a first designated intermediate system (DIS) operation. The identifier can be any suitable object, element, symbol, address, unique name, association, reference etc. associated with a network node. The method further includes detecting a loss of connectivity to the first network node, and receiving a second pseudo-node identifier associated with a second network node via the network. The term 'loss' in this context is expansive and, accordingly, can include any type of disruption or interruption in connectivity, any type of dysfunction, any type of inaccuracy in addressing, any type of power issue, any type of link problem involving the node or the network, etc. The second pseudo-node identifier is generated by the second network node in a second DIS operation. The method further includes executing a first network path determination operation using the first pseudo-node identifier and the second pseudo-node identifier when an elapsed time between the detecting of the loss of connectivity with the first network node and the executing of the first network path determination operation is within a predetermined threshold (e.g., a low mark, a designated time interval, etc.).

In more specific implementations, the method further includes executing a second network path determination operation using the second pseudo-node identifier when the elapsed time exceeds the predetermined threshold. In other more specific implementations, the method further includes purging the first pseudo-node identifier when the elapsed time exceeds the predetermined threshold. In other more specific implementations at least one of the first pseudo-node identifier and the second pseudo-node identifier comprises a link state protocol (LSP) identifier.

In other more specific implementations, the predetermined threshold is based upon an expected time for the second pseudo-node identifier to be received by member nodes of the network. In still other more specific implementations, the first network path determination operation is a shortest path first (SPF) operation. In other specific implementations, the network is a single-hop network. In still other specific implementations, the network is an overlay transport virtualization (OTV) LAN network in which at least one of the first network node and the second network node executes an intermediate system to intermediate system (IS-IS) protocol.

Example Embodiments

Figure 1:
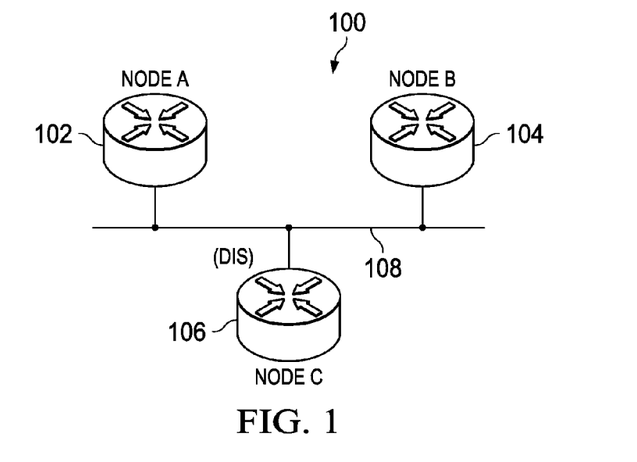
FIG. 1 is a simplified block diagram illustrating a communication system associated with maintaining layer-2 connectivity in a network environment.

Turning to FIG. 1, FIG. 1 is a simplified block diagram illustrating a communication system 100 associated with maintaining layer-2 connectivity in a network environment. Communication system 100 may include a node A 102, a node B 104, and a node C 106. Communication system 100 of FIG. 1 further includes a network 108 to facilitate communication between each of node A 102, node B 104, and node C 106. Network 108 serves as a transport mechanism for data that propagates between node A 102, node B 104, and node C 106. In various embodiments, network 108 may include one or more of a local area network (LAN), a wide area network (WAN), a public switched telephone network (PSTN), or any other suitable network or combination of networks. In at least one embodiment, network 108 is a network in which a single node can offer on-hop connectivity to the surrounding nodes.

In the particular embodiment illustrated in FIG. 1, a local area network (LAN) couples nodes A 102, node B 104, and node C 106 to each other, where a single designated intermediate system (DIS) is indicated for node C 106. The DIS is a logical representation of the LAN and is responsible for maintaining or announcing connectivity information between the other nodes that are present in the network. In general terms, FIG. 1 is depicting the evolution of a network system that is associated with an overlay network. An overlay network typically offers layer-2 connectivity between remote sites over a transport network. The overlay network can include one or more edge devices on each site interconnected with a control plane protocol across a transport network. Each site consists of one or more edge devices, as well as other internal routers, switches, or servers. Hence, two sites can be connected through edge devices to a transport network (e.g., to create a virtual overlay network).

In a particular application, communication system 100 can be applied to an Overlay Transport Virtualization (OTV) scenario in which multiple edge boxes across layer-2 (L2) sites communicate with each other via a layer-3 (L3) or an L2 cloud using an intermediate system to intermediate system (IS-IS) protocol in the control plane. Logistically, the OTV-IS-IS control network has special inherent properties; for example, it is a single hop LAN network. An overlay network maps media access control (MAC) addresses to Internet protocol (IP) addresses of the edge devices. Once the OTV framework identifies the correct edge device to which to send a layer-2 frame, OTV encapsulates the frame and, subsequently, sends the resulting IP packet using transport network routing protocols. In common implementations, OTV supports one or more separate overlay networks, where each overlay network can support one or more virtual LANs (VLANs).

Intermediate System To Intermediate System (IS-IS) is a routing protocol designed to move information efficiently within a computer network, a group of physically connected computers or similar devices. It accomplishes this by determining the best route for datagrams through a packet-switched network. The protocol was defined in ISO 10589 as an international standard within the Open Systems Interconnection (OSI) reference design, and the IETF republished the protocol as an Internet Standard in RFC 1142. IS-IS is a link-state routing protocol which operates by reliably flooding link state information throughout a network of routers. Each IS-IS router independently builds a database of the network's topology, aggregating the flooded network information. IS-IS uses a Shortest Path First (SPF) algorithm for computing the best path through the network. Packets are then forwarded through the network to the destination based on the computed ideal path.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

Before detailing the operations and the infrastructure of FIG. 1, certain contextual information is provided to offer an overview of some problems that may be encountered while maintaining connectivity in a network environment. Such information is offered earnestly and for teaching purposes only and, therefore, should not be construed in any way to limit the broad applications for the present disclosure. In the most general terms, the idea behind the DIS is similar to that of the designated router in the Open Shortest Path First (OSPF) protocol. The DIS creates a pseudo-node (i.e., a virtual node), where routers on a LAN (including the DIS) form an adjacency with the pseudo-node instead of forming a customary n*(n−1) order adjacencies with each other in a full mesh.

In operation, and in the context of a LAN environment, one of the routers elects itself the DIS based on interface priority (e.g., the default being 64). If the interface priorities were the same, the router with the highest sub-network point of attachment (SNPA) would be selected. MAC addresses are the SNPA on LANs. On Frame Relay networks, the local data-link connection identifier (DLCI) is the SNPA. If the SNPA is a data-link connection identifier (DLCI) and is the same at both sides of a link, the router with the higher system ID (in the network service access point (NSAP) address) would become the DIS. A pseudo-node link state protocol data unit (PDU) (LSP) represents a LAN, including the intermediate systems (ISs) attached to that LAN, just as a non-pseudo-node LSP represents a router, including the ISs and LANs connected with the router.

The DIS election is commonly preemptive (unlike with OSPF model). If a new router boots on the LAN with a higher interface priority, it becomes the DIS, it purges the old pseudo-node LSP, and a new set of LSPs would be flooded. If a router needs an LSP because it is older than the LSP advertised by the DIS in its complete sequence number PDU (CSNP), or because it is missing an LSP that is listed in the CSNP, it will send a partial sequence number PDU (PSNP) to the DIS and, subsequently, receive the LSP in return.

The OTV paradigm builds L2 reachability information by communicating between edge devices with the overlay protocol. The overlay protocol can form adjacencies with the edge devices. Once each edge device is adjacent to its peers on the overlay, the edge devices can share MAC address reachability information with other edge devices that participate in the same overlay network.

Typically, in an IS-IS LAN network scenario, one of the routers elects itself as the DIS based on a standard algorithm (e.g., such as that which is defined in specifications that describe the IS-IS protocol). For example, such an algorithm is describes in the aforementioned ISO 10589. The DIS election is preemptive; if a new router boots up on the LAN with a higher interface priority or a higher system ID, it becomes the DIS. The DIS helps to reduce the amount of data in a given link-state database and, further, it aids in the processing of the shortest path first (SPF) calculation. A pseudo-node can advertise the neighbor relationships of routers in its database update, where the actual nodes can advertise a relationship with only the pseudo-node. When a pseudo-node is introduced on the link, routers only advertise a relationship to that particular node.

The DIS election process (e.g., whenever a LAN Hello message is received) means that if a Hello message being received has a higher priority than the existing DIS (or a higher MAC address if the priority is equal to the DIS priority), the originator of the Hello becomes the DIS. When the DIS is preempted (or when it resigns by lowering its priority to be below that of another router on the link), the new DIS purges the pseudo-node link state protocol data units (PDUs) (LSPs). The new DIS then originates its own LSP, and other routers synchronize to the new DIS's link state database. In a typical implementation, after the DIS election completes, and there is a change in the DIS on the LAN, the nodes would run (or execute) an SPF algorithm.

The DIS is responsible for creating and updating the pseudo-node Link State PDU (LSP) for reporting links to the systems on the broadcast subnetwork and for flooding LSPs over the LAN. When IS-IS routers in the LAN lose connectivity to the DIS, traffic flows between systems are disrupted, until the next DIS election takes place and the new pseudo-node LSP is generated by the new DIS node reporting that connectivity to the nodes in the LAN is restored.

In a standard implementation of IS-IS, whenever there is a change in the DIS, including a case in which the connectivity to the DIS is lost, the nodes re-run DIS election. The new DIS generates an updated pseudo-node LSP. After receiving the updated pseudo-node LSP from the DIS on the LAN, nodes run a Shortest Path First (SPF) algorithm. Since nodes run DIS election and SPF in a distributed fashion, it is expected that there may be a window in time during which connectivity using the older DIS is lost and before it is regained using the new pseudo-node LSP. Since an SPF may be run during this window, connectivity of the LAN may be broken. During this time window, routes may go missing only to be added back a later.

Figure 2:
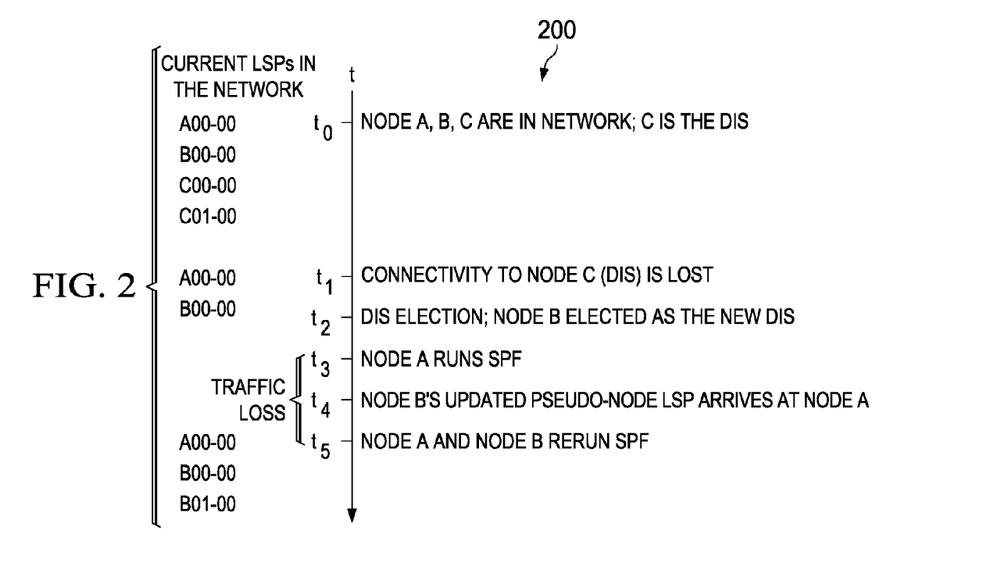
FIG. 2 is a simplified timeline diagram illustrating an example implementation of standard intermediate system to intermediate system (IS-IS) in a network in which connectivity loss to a designated intermediate system (DIS) occurs.

Referring now to FIG. 2, FIG. 2 is a simplified timeline diagram 200 illustrating an example implementation of standard IS-IS in a network in which connectivity loss to the DIS occurs. Consider an example including the communication system 100 of FIG. 1 having node A 102, Node B 104, and node C 106. In this example, a standard implementation of IS-IS is used within communication system 100. At time $t_0$, node A 102, node B 104, and node C 106 are in the network and Node C 106 is the current DIS. Node C 106 was previously elected as the DIS by having the highest interface priority from among the interface priorities of node A 102, node B 104, and node C 106. At this time, there are three current LSPs generated within the network having the following LSP-IDs: A00-00 associated with node A 102, B00-00 associated with node B 104, and C00-00 associated with node C 106. In the OTV network, MAC information that is announced within LSP fragments A00-00, B00-00, and C00-00 are used to maintain traffic flows between members and between hosts behind OTV edge devices (i.e., nodes A, B, and C). In addition, a pseudo-node LSP is generated by node C 106 operating as the DIS having a pseudo-node LSP-ID of: C01-00. The pseudo-node LSP announces connectivity to the other nodes of the network. The nodes, including the DIS, report connectivity to the pseudo-node in their LSPs.

At time $t_1$, connectivity to the interface of node C 106 operating as the DIS is lost. Such loss may be, for example, due to administrator action, device failure, or a failure on the segment. At this time, the LSP-ID c00-00 and the pseudo-node LSP C01-00 are lost and only LSP-IDs A00-00 and B00-00 remain as current LSPs in the network. In a standard implementation of IS-IS, the old pseudo-node LSP, C01-00, is purged and the previous non-DIS nodes, node A 102 and node B 104, are triggered to run DIS election as soon as the adjacency to node C 106 is detected as lost. Accordingly, at time $t_2$, a DIS election procedure is performed by node A 102 and node B 104. As a result of the DIS election procedure, node B 104 is elected as the new DIS as a result of having the highest interface priority among the interface priorities of node A 102 and node B 104. The LSP-IDs in steady state after the DIS election completes and newer ones are generated are A00-00, B00-00 and the pseudo-node LSP-ID B01-00. The LSP fragments (A00-00 and B00-00 in this example) show connectivity via the DIS, node B 105, through the pseudo-node LSP (B01-00) and vice versa.

However, if node A 102 runs an SPF algorithm and the new updated pseudo-random LSP-ID generated by node B 104, B01-00, has not arrived at node A 102 while node A is running the SPF, then it is possible that there is a loss of connectivity between node A 102 and node B 104 which causes traffic loss. This is possible because the loss of an adjacency to node C 106 will trigger an SPF run at node A 102.

At time $t_3$, node A 102 runs a SPF algorithm due to a loss of adjacency with node C 106. At time $t_4$, the updated pseudo-node LSP (B01-00) generated by node B 104 arrives at node A 102. At time $t_5$, node A 102 and node B 104 rerun the SPF algorithm. At this time, the current LSP in the network are LSP-ID A00-00 associated with node A 102, LSP-ID B00-00 associated with node B 104, and the pseudo-node LSP-ID B01-00. However, with a standard implementation of IS-IS, traffic is lost in the network between times $t_3$-$t_5$.

In certain example embodiments, communication system 100 is configured to overcome the aforementioned shortcomings (and others) by ensuring that traffic flow between member nodes of the network is not disrupted during loss of adjacency to the Designated Intermediate System (DIS). Specifically, communication system 100 is configured to prevent traffic flow disruption in the event that the connectivity to the DIS is lost, by ensuring that the pseudo-node LSP from the old DIS is used by the non-DIS nodes in the event there is an SPF run until the updated pseudo-node LSP from the new DIS announcing complete connectivity is received within the network.

Figure 3:
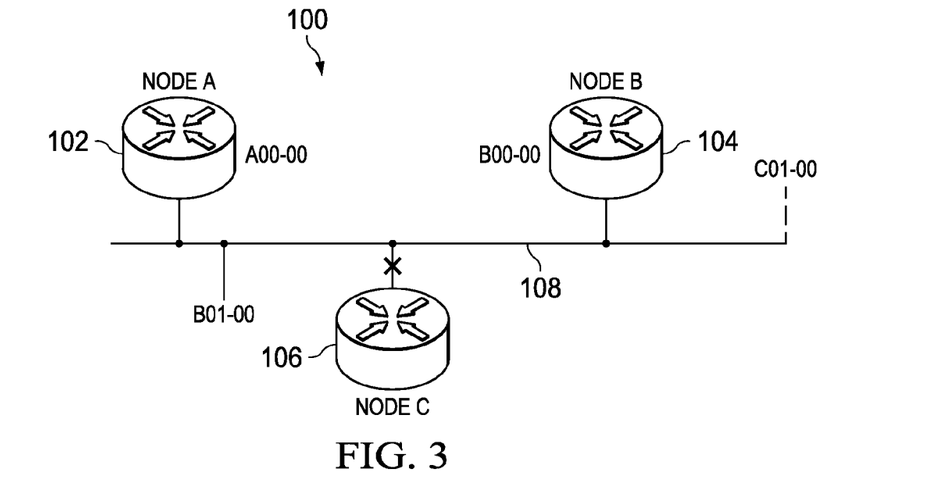
FIG. 3 is a simplified block diagram of communication system of FIG. 1 after failure of a designated intermediate system (DIS)

Turning to FIG. 3, FIG. 3 is a simplified block diagram of communication system 100 of FIG. 1 after failure of a designated intermediate system (DIS). In the example illustrated in FIG. 3, connectivity of node C 106 with the rest of communication system 100 is lost. Looking further into the time window in which node A 102 and node B 104 may lose connectivity with the DIS node C 106 in a single hop OTV-IS-IS LAN network as described in the above example, upon detecting a loss of adjacency with node C 106, node A 102 and node B 104 each run a DIS election algorithm after a hold down timer determines that a period of time known as the hold down time has expired. The hold down time is a period of time representative of a delay in time between detection of loss of adjacency to the DIS by a node and the node actually running the DIS election algorithm. This hold down time is represented as a time T1. It is expected that in most cases, there will be a skew of at most one hold down time (T1) for each of the nodes to detect loss of adjacency with the DIS. Accordingly, node A 102 and node B 104 are expected to detect a loss of adjacency (or connectivity) with node C 106 within the time period T1 after node C 106 losses adjacency.

Further, assume that node B 104 which eventually becomes the new DIS, discovers this loss of adjacency with node C 106 in a time period of T1 after node A 102 discovers the loss of adjacency with node C 106. Also, assume that the time taken by node B 104 to run the DIS election, generate the new pseudo-node LSP with complete network connectivity, and for the new pseudo-node LSP to reach the members of the LAN to be equal to a time period T2. During the time window equal to T1+T2, any SPF computation at node A 102 or any other node on the LAN, would result in loss of connectivity, impacting traffic flows between nodes.

Various embodiments provide for a graceful removal of old an DIS after the DIS loses adjacency with the aim of preventing any traffic impact during the time window of T1+T2 described above. In one or more embodiments, nodes that lose connectivity to the DIS continue to use the pseudo-node LSP generated by the old DIS in the SPF computation for a time period of T1+T2 even though the adjacency to the DIS is in a "down/lost" state until the updated complete pseudo-node LSP generated by the new DIS is received by the nodes from the new DIS. During this grace time period of T1+T2, the new pseudo-node LSP is being built by the new DIS and the new DIS delays the purge of the older pseudo-node LSP. At the end of this time window, it is expected that new connectivity information to the new DIS node B 104 and from the new DIS node B 104 will be formed and announced in the new pseudo-node LSP.

In the example illustrated in FIG. 3, the older pseudo-node LSP-ID of C01-00 is retained by node A 102 and node B 104 for a time period of T1+T2. After the time period of T1+T2, it is assumed that the new pseudo-node LSP-ID B01-00 generated by the new DIS, node B 104, contains the new complete connectivity information. Any SPF that is run prior to this time window of T1+T2 uses the older connectivity information of pseudo-node LSP-ID C01-00. This solution is possible because the use of the pseudo-node LSP-ID C01-00 during this time window is possible because it does not require that node C 106 actually exist within the network. It should be noted that only the pseudo-node LSP generated by the old DIS node C 106 is used by the other nodes in the network when adjacency to node C 106 is lost, not the non-pseudo-node LSP generated by node C 106.

After the T1+T2 time window has elapsed, the new DIS, node B 104, may now purge the pseudo-node LSP, C01-00, received from the older DIS node C 106. From this time forward, node A 102 and node B 104 no longer use the old pseudo-node LSP associated with node C 106 for SPF runs and instead use only the pseudo-node LSP associated with node B 104.

Such a procedure is entirely feasible in a single hop LAN network. In a multi-hop network, use of the older pseudo-node may delay convergence expect in particular circumstances such as if the network is a stub LAN in which there is no transit traffic through the LAN. For a general multi-hop IS-IS network, this "special" knowledge of parallel-DIS during failure may not generally be available to nodes outside of the LAN to re-route traffic that was originally going through the DIS. However, in particular circumstances, the embodiments described herein may be applied to multi-hop networks as well as single-hop networks.

In regards to the adjacency update process, there can be minimal changes to the existing IS-IS adjacency state machine. Each node can be configured to maintain a list of neighbor/adjacency and DIS information. Once connectivity to the current DIS is lost, the nodes can announce connectivity to both the old pseudo-node LSP and the newly elected pseudo-node LSP for the T1+T2 time duration. The adjacency update process actions can be formed by the remaining nodes within a network. For example, in the example illustrated in FIG. 3, the adjacency update actions can be performed by node B 104 and node C 106. It should be noted that in particular embodiments connectivity to the old DIS is on a "down/lost" adjacency state.

In regards to the LSP generation process, nodes in the network can be configured to announce connectivity to both the old and the new pseudo-node LSP during the grace time of T1+T2 using existing reachability rules. In addition, the "new" DIS can be configured to not withdraw/purge the "old" pseudo-node LSP until the expiry of this grace window of T1+T2. In one or more embodiments, the announcement of members in the new pseudo-node follow existing reachability rules. Accordingly, in essence a make-before-break scenario is created with the old DIS and the new DIS, which shows up as a parallel link to both the old DIS and the new DIS during the time period of T1+T2.

For the actual SPF activities, nodes can be configured such that that the old pseudo-node LSP is used although the adjacency to the old DIS is lost during the grace window period of T1+t2. This ensures that the earlier LAN is used in parallel with the new LAN as it is being built. The SPF runs during the grace window of T1+T2 are seeded with both the old and the new pseudo-node LSPs on the same interface. After the grace window, normal existing SPF rules are used. It should be noted that on the local LAN, since the adjacency information is in a down state, the non-pseudo-node LSPs from the old DIS may be ignored if desired.

One or more embodiments described herein may be used in a IS-IS LAN as long as the nodes on the broadcast subnetwork follow the above procedures. In the event, connectivity to the node C 106 flaps, there are two cases. If pseudo-node LSP associated with the node B 104 has formed completely, it will look like a new node C 106 joining the network and procedures associated with new nodes joining the network may be followed. In the event the pseudo-node LSP associated with node B 104 has not formed completely, this implies that nodes in the network are still dependent on the older incarnation of the pseudo-LSP associated with node C 106 for forwarding traffic. In that case, node C 106 does not purge its older pseudo-LSPs immediately. Instead, node C 106 delays purging its pseudo-LSPs upon joining the network.

Figure 4:
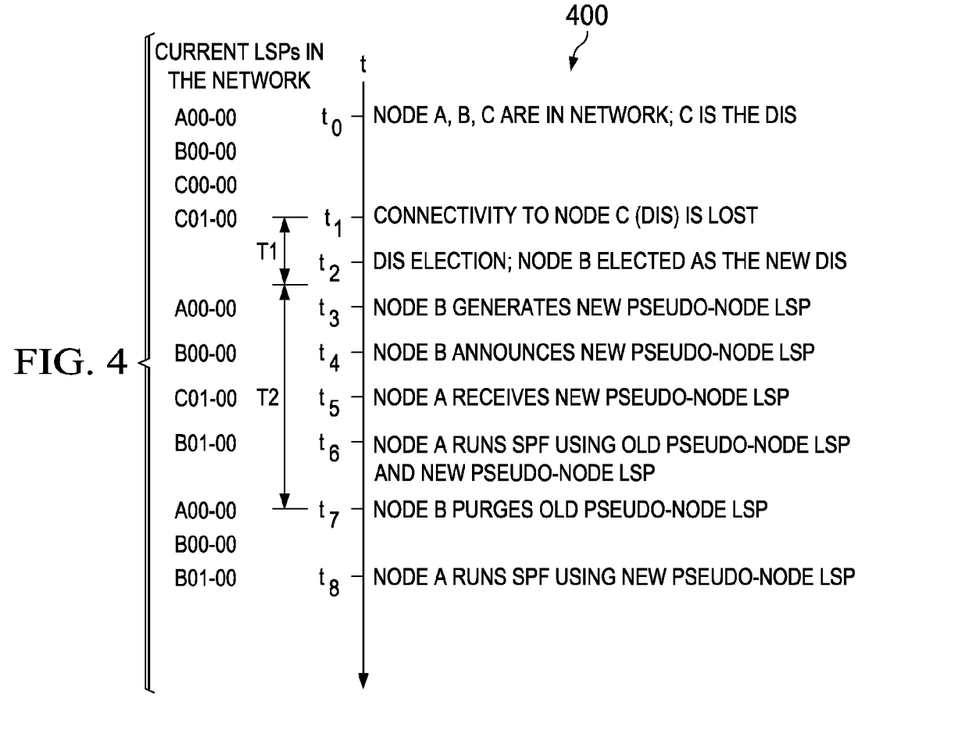
FIG. 4 is a simplified timeline diagram illustrating an example implementation of various embodiments of maintaining connectivity in a single-hop network environment in which connectivity loss to the DIS occurs.

Referring now to FIG. 4, FIG. 4 is a simplified timeline diagram 400 illustrating an example implementation of various embodiments of maintaining connectivity in a single-hop network environment in which connectivity loss to the DIS occurs. Consider an example including the communication system 100 of FIGS. 1 and 3 having node A 102, Node B 104, and node C 106. In this example, an implementation of maintaining connectivity in a single-hop network environment as described in association with various embodiments is used within communication system 100. At time $t_0$, node A 102, node B 104, and node C 106 are in the network and Node C 106 is the current DIS. Node C 106 was previously elected as the DIS by having the highest interface priority from among the interface priorities of node A 102, node B 104, and node C 106. At this time, there are three current LSPs generated within the network having the following LSP-IDs: A00-00 associated with node A 102, B00-00 associated with node B 104, and C00-00 associated with node C 106. In addition, a pseudo-node LSP is generated by node C 106 operating as the DIS having a pseudo-node LSP-ID of: C01-00. The pseudo-node LSP announces connectivity to the other nodes of the network. The nodes, including the DIS, report connectivity to the pseudo-node in their LSPs.

At time $t_1$, connectivity to the interface of node C 106 operating as the DIS is lost. At time $t_2$, a DIS election procedure is performed by node A 102 and node B 104. As a result of the DIS election procedure, node B 104 is elected as the new DIS as a result of having the highest interface priority among the interface priorities of node A 102 and node B 104. T1 is representative of a hold down time equal to an expected time delay between detection of loss of adjacency to the DIS by a node and the node actually running the DIS election algorithm.

At time $t_3$, node B 104 generates a new pseudo-node LSP. At time $t_4$, node B announces the new pseudo-node LSP to the other nodes in the network. At this time, the current LSPs in the network include A00-00 associated with node A 102, B00-00 associated with node B 104, the old pseudo-node LSP C01-00, and the new pseudo-node LSP B01-00. At time $t_5$, node A 102 receives the new pseudo-node LSP announced by node B 104. At time $t_6$, node A 102 runs a SPF using both the old pseudo-node LSP, C01-00, and the new pseudo-node LSP, B01-00. T2 is representative of an expected time for node B 104 to run the DIS election, generate the new pseudo-node LSP with complete network connectivity, and for the new pseudo-node LSP to reach the members of the LAN.

At time $t_7$ (at the end of T2), node B 104 purges the old pseudo-node LSP. From time $t_2$ forward any SPF runs in the network will be performed using only the new pseudo-node LSP. At this time, the current LSP in the network include A00-00 associated with node A 102, B00-00 associated with node B 104, and the new pseudo-node LSP B01-00. For example, if at subsequent time $t_8$ node A 102 runs an SPF procedure, node A 102 will use only the new pseudo-node LSP B01-00.

However, if node A 102 runs an SPF algorithm and the new updated pseudo-random LSP-ID generated by node B 104, B01-00, has not arrived at node A 102 while node A is running the SPF, then it is possible that there is a loss of connectivity between node A 102 and node B 104 which causes traffic loss. This is possible because the loss of an adjacency to node C 106 will trigger an SPF run at node A 102. In contrast to the standard implementation of IS-IS as illustrated in the timeline 200 of FIG. 2, traffic loss within the network is avoided during election of a new DIS in which loss of an original DIS occurs.

Before turning to additional capabilities and features of the present disclosure, the infrastructure of FIGS. 1 and 3 is further discussed. Nodes 102, 104, and 106 are network nodes (e.g., edge devices, routers, gateways, etc.) that can be configured for exchanging network data. Nodes 102, 104, and 106 can also be configured to react to the contents, the payloads, and/or the headers of packets exchanged in a network environment. Nodes 102, 104, and 106 are network nodes that are meant to encompass network appliances, servers, routers, switches, gateways, bridges, loadbalancers, firewalls, processors, edge devices, modules, or any other suitable device, component, element, or object operable to exchange information in a network environment. Moreover, the network nodes may include any suitable hardware, software, components, modules, interfaces, or objects that facilitate the operations thereof. This may be inclusive of appropriate algorithms and communication protocols that allow for the effective exchange of data or information.

Each of nodes 102, 104, and 106 can execute the IS-IS protocol during their operations. From a high level, IS-IS operates as follows. First, nodes 102, 104, and 106 (e.g., routers) running IS-IS send Hello packets from IS-IS-enabled interfaces to discover neighbors and to establish adjacencies. Nodes 102, 104, and 106 sharing a common data link will become IS-IS neighbors if their Hello packets contain information that meets the criteria for forming an adjacency. The criteria differ slightly depending on the type of media being used (e.g., p2p, broadcast, etc.). The main criteria can include matching authentication, IS-type, MTU size, etc. Routers may build a link-state packet based on their local interfaces that are configured for IS-IS and prefixes learned from other adjacent routers. Generally, routers flood LSPs to the adjacent neighbors except the neighbor from which they received the same LSP. However, there are different forms of flooding, and also a number of scenarios in which the flooding operations may differ. Routers can construct their link-state database from these LSPs. A shortest-path tree (SPT) is calculated by each IS, and from this SPT, the routing table can be constructed. The routing table, the link state database, and any other suitable routing information may be stored in memory elements nodes (such as depicted in FIG. 5).

For adjacency building, neighbors on point-to-point networks become adjacent unless they do not see themselves in their neighbors' Hello PDU (and match on certain parameters). On broadcast networks and non-broadcast multi-access (NBMA) networks, the DIS can become adjacent with its neighbors. In most instances, routers will become neighbors if the following parameters are agreed upon: 1) Level 1, where the two routers sharing a common network segment have their interfaces configured to be in the same area to achieve a Level 1 adjacency; and 2) Level 2, where two routers sharing a common network segment are configured as Level 2 if they are in different areas and seek to become neighbors.

Network 108 represents a series of points or nodes of interconnected communication paths for receiving and transmitting packets of information that propagate through communication system 100. Network 108 offers a communicative interface between any of the components of FIG. 1 and remote sites and/or devices, and may be any local area network (LAN), wireless local area network (WLAN), metropolitan area network (MAN), wide area network (WAN), virtual private network (VPN), Intranet, Extranet, or any other appropriate architecture or system that facilitates communications in a network environment. Network 108 may implement a UDP/IP connection and use a TCP/IP communication language protocol in particular embodiments of the present disclosure. However, network 108 may alternatively implement any other suitable communication protocol for transmitting and receiving data packets within communication system 100.

Figure 5:
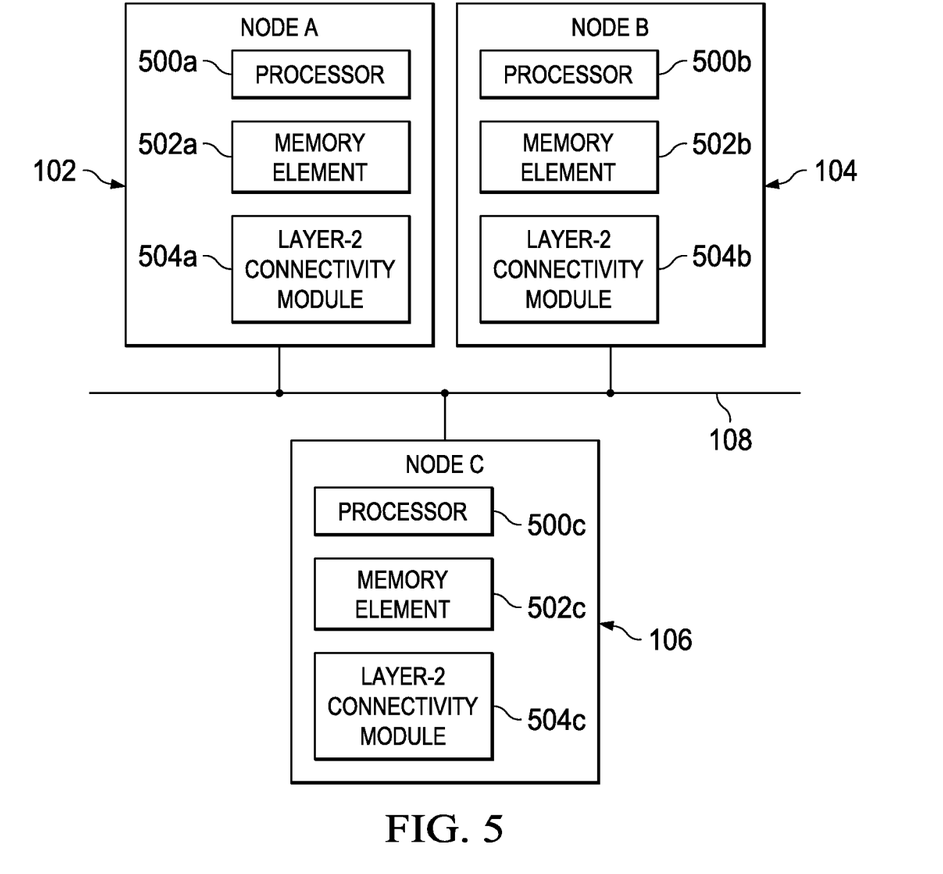
FIG. 5 is a simplified block diagram illustrating potential details associated with the communication system.

Referring now to FIG. 5, FIG. 5 is a simplified block diagram illustrating potential details associated with communication system 100. In this particular example, nodes A-C are provisioned with respective processors 500*a-c*, memory elements 502*a-c*, and layer-2 connectivity modules 504*a-c*. Layer-2 connectivity modules 504*a-c* are configured to maintain connectivity to other nodes within the network for a configurable period of time between loss of connectivity to an existing DIS and communication of a new pseudo-node LSP associated with a newly elected DIS. At least in the generic sense, a make-before-break mechanism is being implemented in communication system 100 as further described herein.

In one example implementation, each of nodes 102, 104, and 106 include software (e.g., as part of layer-2 connectivity modules 504*a-c*, etc.) to achieve, or to foster, the connectivity operations, as outlined herein. In other embodiments, this feature may be provided externally to these elements, or included in some other network device to achieve this intended functionality. Alternatively, these elements can include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Hence, appropriate software and/or hardware can be provisioned in nodes 102, 104, and 106 in order to facilitate the connectivity features discussed herein. A single instance of the enhanced node may be provisioned in a given network scenario (e.g., at a network edge) to achieve the teachings of the present disclosure, or multiple instances of this element may be provisioned based on the particular use case. Alternatively, such a mechanism can be provisioned in any other element in a network environment. Such provisioning may be based on particular operator constraints, particular networking environments, specific types of data, particular types of hardware/software, and/or specific protocol parameters. Note that in certain examples, certain databases can be consolidated with memory elements (or vice versa), or the storage mechanisms of the present disclosure can overlap/exist in any other suitable manner.

In regards to the internal structure associated with communication system 100, each of nodes 102, 104, and 106 can include memory elements for storing information to be used in achieving the connectivity operations, as outlined herein. Additionally, each of these devices may include a processor that can execute software or an algorithm to perform the connectivity activities discussed herein. These devices may further keep information in any suitable memory element

[(e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element.' The information being tracked or sent by nodes 102, 104, and 106 could be provided in any database, queue, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network nodes can also include suitable interfaces for receiving, transmitting, and/or otherwise communicating data or information in a network environment.

Note that in certain example implementations, the connectivity functions outlined herein may be implemented by logic encoded in one or more tangible, non-transitory media (e.g., embedded logic provided in an ASIC, in DSP instructions, software [potentially inclusive of object code and source code] to be executed by a processor, or other similar machine, etc.). In some of these instances, memory elements [as shown in FIG. 5] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 5] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 6:
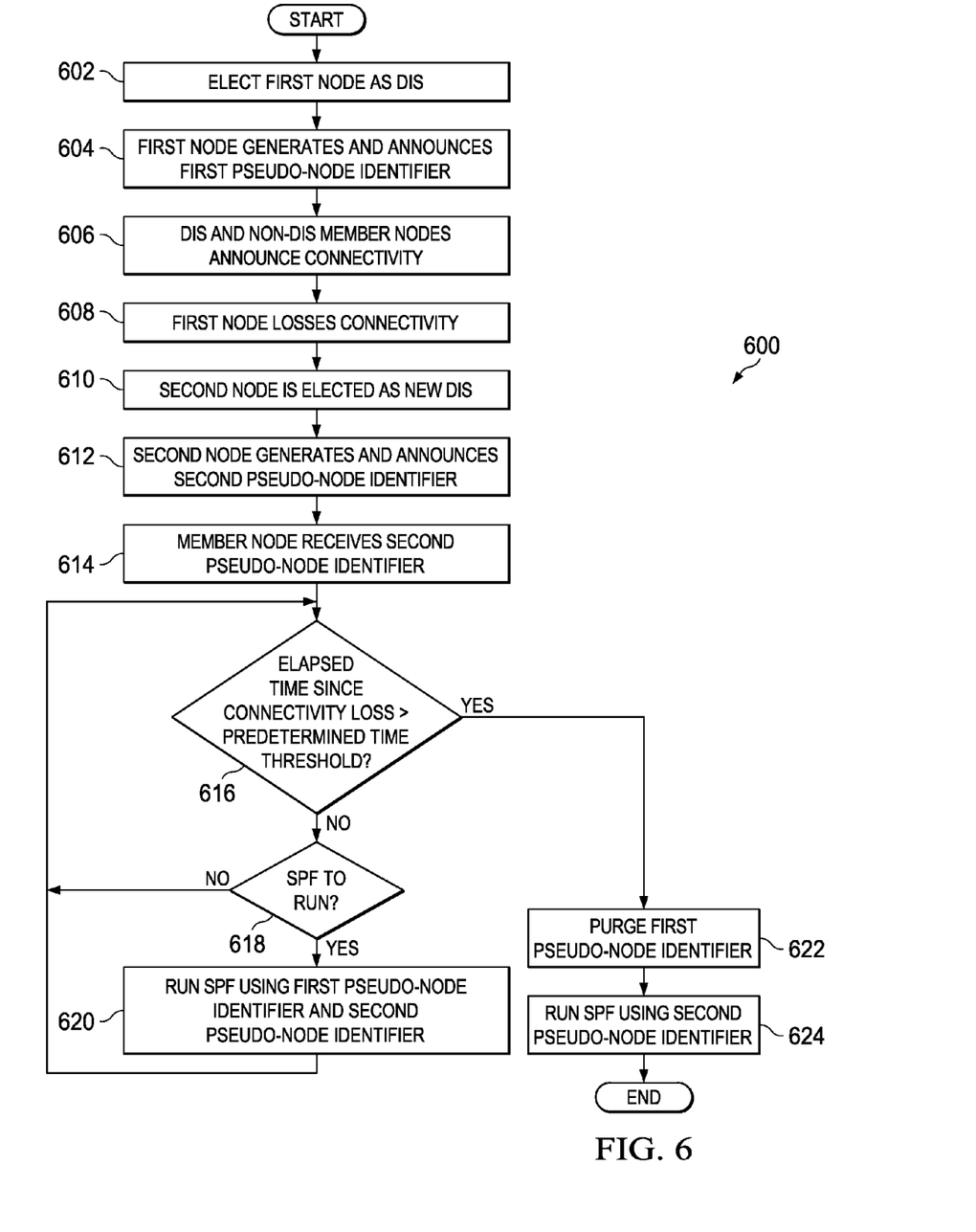
FIG. 6 is a simplified flowchart illustrating one possible operational flow associated with the communication system.

FIG. 6 is a simplified flowchart 600 illustrating one possible operational flow associated with the communication system. In 602, a first node of communication system 100 is elected as the DIS. In a particular embodiment, node C 106 is elected as the DIS in a communication system including node A 102 having an LSP-ID A00-00, node B 104 having an LSP-ID B00-00, and node C 106 having an LSP-ID C00-00. In 604, the first node generates a first pseudo-node identifier associated with the first node and announces the first pseudo-node identifier to the member nodes of the communication system. In at least one embodiment, the first pseudo-node identifier is a pseudo-node LSP. In a particular embodiment, the pseudo-node LSP has a pseudo-node LSP-ID of C01-00. In 606, the DIS and non-DIS member nodes announce connectivity to the pseudo-node identifier. In a particular embodiment, C01-00 announces that it is connected to A00-00 and to B0-00, and separately B00-00 announces it is connected to C01-00, and A00-00 announces it is connected to C01-00.

In 608, the first node losses connectivity to the other members of the network. In a particular embodiment, node C 106 losses connectivity to node A 102 and node B 104. In 610, a second node is elected as the new DIS. In at least one embodiment, the DIS election procedure is initiated by each of the remaining member nodes as a result of detecting the loss of connectivity to the first node. In at least one embodiment, the second node is elected as the new DIS as a result of having the highest interface priority among the existing member nodes. In a particular embodiment, node B 104 is elected as the new DIS. In 612, the second node generates and announces a second pseudo-node identifier that is associated with the second node to the other members. In at least one embodiment, the second pseudo-node identifier is a pseudo-node LSP-ID. In a particular embodiment, node B 104 generates a pseudo-node LSP-ID B01-00. In 614, one or more other member nodes receives the second pseudo-node identifier. In a particular embodiment, node A 102 receives the second pseudo-node identifier.

In 616, one or more member nodes determines whether an elapsed time since detecting a connectivity loss to the first node is greater than a predetermined time threshold. In at least one embodiment, the predetermined time threshold is equal to the grace window T1+T2 as described hereinabove. In a particular embodiment, T1 is equal to the maximum expected time for each of the nodes to detect loss of adjacency with the DIS, and T2 is equal to a maximum expected time for the second node (the new DIS) to run the DIS election procedure, generate the second (new) pseudo-node identifier with complete network connectivity, and for the second (new) pseudo-node identifier to reach the members of the network.

If the elapsed time has not exceeded the predetermined time threshold, the operational flow continues to 618. In 618, it is determined whether there is a shortest path first (SPF) operation that is to be run. In no SPF operation is to be run, the operational flow returns to 616. However, if an SPF operation is to be run, the operational flow continues to 620. In 620, the SPF operation is run seeded using both the first pseudo-node identifier associated with the first node (the old DIS) and the second pseudo-node identifier associated with the second node (the new DIS). In a particular embodiment, node A 102 runs an SPF operation using both the first pseudo-node identifier associated with node C 106, C01-00, and the second pseudo-node identifier associated with node B 104 (B01-00). The operational flow then returns to 616.

If it is determined in 616 that that the elapsed time has exceeded the predetermined time threshold, the operational flow continues to 622. In 622, the first pseudo-node identifier is purged. In 624, a subsequent SPF is run using the second pseudo-node identifier associated with the second node. The first pseudo-node identifier is no longer used for SPF run operations subsequent to the expiry of the predetermined time threshold. The operational flow then ends. In a general sense, a make-before-break mechanism is achieved in which an old pseudo-node identifier associated with an old DIS (who's connectivity has been lost) is continued to be used along with a new pseudo-node identifier associated with a new DIS in SPF runs until the new pseudo-node identifier has been received by the members of the network. Thus, in a particular embodiment in a single-hop OTV IS-IS control plane, by performing graceful removal of the pseudo-node LSP in the case in which the connectivity to the DIS is lost, existing traffic flows may be maintained without drops.

An advantage that may be offered by at least one embodiment of the present disclosure is that it helps in maintaining a traffic loss network, even in the event connectivity to the DIS is lost on an OTV overlay. In the absence of the such procedures described above, there is a high chance of traffic disruption in the OTV network in such a circumstance. Various embodiments described above may further provide for graceful migration of routes with the latest network information, resulting in little or no operational impact to the network.

Note that with the examples provided above, as well as numerous other examples provided herein, interaction may be described in terms of two, three, or four network nodes. However, this has been done for purposes of clarity and example only. In certain cases, it may be easier to describe one or more of the functionalities of a given set of flows by only referencing a limited number of network nodes. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

Additionally, although described with reference to particular scenarios, where a connectivity module is provided within the network nodes, these modules can be provided externally, or consolidated and/or combined in any suitable fashion. In certain instances, the connectivity module may be provided in a single proprietary element, device, unit, etc. Additionally, the teachings of the present disclosure can readily be used by any protocol in which certain types of processing is being performed along a given network pathway. Moreover, the teachings of the present disclosure are readily applicable to legacy systems, long-term evolution (LTE) configurations, or any other suitable architecture in which similar connectivity scenarios would be present.

Additionally, communication system 100 can be applicable to any type of point-to-point networks (e.g., such as serial lines that connect a single pair of routers), broadcast networks (e.g., such as Ethernet, Token Ring, and Fiber Distributed Data Interface (FDDI)), non-broadcast multi-access (NBMA) networks (e.g., such as Frame Relay, Asynchronous Transfer Mode (ATM), and X.25), etc. Although various embodiments are described as using an SPF operation to determine a network path, it should be understood that in other embodiments any suitable network path determination operation may be used.

It is also important to note that the steps in the appended diagrams illustrate only some of the possible signaling scenarios and patterns that may be executed by, or within, communication system 100. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving a first pseudo-node identifier associated with a first network node via a network, the first pseudo-node identifier being generated by the first network node in a first designated intermediate system (DIS) operation;
   detecting a loss of connectivity to the first network node;
   receiving a second pseudo-node identifier associated with a second network node via the network, the second pseudo-node identifier being generated by the second network node in a second DIS operation; and
   executing a first network path determination operation using the first pseudo-node identifier and the second pseudo-node identifier when an elapsed time between the detecting of the loss of connectivity with the first network node and the executing of the first network path determination operation is within a predetermined threshold.

2. The method of claim 1, further comprising:
   executing a second network path determination operation using the second pseudo-node identifier when the elapsed time exceeds the predetermined threshold.

3. The method of claim 1, further comprising:
   purging the first pseudo-node identifier when the elapsed time exceeds the predetermined threshold.

4. The method of claim 1, wherein at least one of the first pseudo-node identifier and the second pseudo-node identifier comprises a link state protocol (LSP) identifier.

5. The method of claim 1, wherein the predetermined threshold is based upon an expected time for the second pseudo-node identifier to be received by member nodes of the network.

6. The method of claim 1, wherein the first network path determination operation is a shortest path first (SPF) operation.

7. The method of claim 1, wherein the first and second network nodes are part of a single-hop network.

8. The method of claim 1, wherein the network is an overlay transport virtualization (OTV) LAN network in which at least one of the first network node and the second network node executes an intermediate system to intermediate system (IS-IS) protocol.

9. Logic encoded in non-transitory media that includes code for execution and when executed by a processor operable to perform operations comprising:
   receiving a first pseudo-node identifier associated with a first network node via a network, the first pseudo-node identifier being generated by the first network node in a first designated intermediate system (DIS) operation;
   detecting a loss of connectivity to the first network node;
   receiving a second pseudo-node identifier associated with a second network node via the network, the second pseudo-node identifier being generated by the second network node in a second DIS operation; and
   executing a first network path determination operation using the first pseudo-node identifier and the second pseudo-node identifier when an elapsed time between the detecting of the loss of connectivity with the first network node and the executing of the first network path determination operation is within a predetermined threshold.

10. The logic of claim 9, wherein the operations further include executing a second network path determination operation using the second pseudo-node identifier when the elapsed time exceeds the predetermined threshold.

11. The logic of claim 9, wherein the operations further include purging the first pseudo-node identifier when the elapsed time exceeds the predetermined threshold.

12. The logic of claim 9, wherein at least one of the first pseudo-node identifier and the second pseudo-node identifier comprises a link state protocol (LSP) identifier.

13. The logic of claim 9, wherein the predetermined threshold is based upon an expected time for the second pseudo-node identifier to be received by member nodes of the network.

14. The logic of claim 9, wherein the first network path determination operation is a shortest path first (SPF) operation.

15. An apparatus, comprising:
a memory element configured to store electronic code;
a processor operable to execute instructions associated with the electronic code; and
a connectivity module configured to interface with the processor such that the apparatus is configured to:
receive a first pseudo-node identifier associated with a first network node via a network, the first pseudo-node identifier being generated by the first network node in a first designated intermediate system (DIS) operation;
detect a loss of connectivity to the first network node;
receive a second pseudo-node identifier associated with a second network node via the network, the second pseudo-node identifier being generated by the second network node in a second DIS operation; and
execute a first network path determination operation using the first pseudo-node identifier and the second pseudo-node identifier when an elapsed time between the detecting of the loss of connectivity with the first network node and the executing of the first network path determination operation is within a predetermined threshold.

16. The apparatus of claim 15, wherein the connectivity module is further configured to execute a second network path determination operation using the second pseudo-node identifier when the elapsed time exceeds the predetermined threshold.

17. The apparatus of claim 15, wherein the connectivity module is further configured to purge the first pseudo-node identifier when the elapsed time exceeds the predetermined threshold.

18. The apparatus of claim 15, wherein at least one of the first pseudo-node identifier and the second pseudo-node identifier comprises a link state protocol (LSP) identifier.

19. The apparatus of claim 15, wherein the predetermined threshold is based upon an expected time for the second pseudo-node identifier to be received by member nodes of the network.

20. The apparatus of claim 15, wherein the first network path determination operation is a shortest path first (SPF) operation.

* * * * *